United States Patent [19]

Funayama et al.

[11] Patent Number: 5,292,830
[45] Date of Patent: Mar. 8, 1994

[54] THERMOSETTING COPOLYMERS, SILICON CARBIDE-BASED FIBER AND PROCESSES FOR PRODUCING SAME

[75] Inventors: Osamu Funayama; Tomohiro Kato; Rika Takatsu; Yuuji Tashiro; Toshihide Kishi; Takayuki Date; Takeshi Isoda, all of Saitama, Japan

[73] Assignee: Tonen Corporation, Tokyo, Japan

[21] Appl. No.: 900,843

[22] Filed: Jun. 18, 1992

[30] Foreign Application Priority Data

Jun. 20, 1991 [JP] Japan .................. 3-148678
Jul. 31, 1991 [JP] Japan .................. 3-192074

[51] Int. Cl.$^5$ .............................. C08G 77/56
[52] U.S. Cl. ........................ 525/478; 528/5; 528/30; 528/31; 428/364; 428/366; 423/277; 423/284; 423/286; 423/325; 423/324; 423/327.1
[58] Field of Search ........... 528/5, 30, 31; 428/364, 428/366; 525/478; 423/277, 284, 286, 325, 324, 327

[56] References Cited

U.S. PATENT DOCUMENTS

| | | | |
|---|---|---|---|
| 3,249,580 | 5/1986 | Beck | 528/30 |
| 4,312,970 | 1/1982 | Gaul, Jr. | 526/279 |
| 4,340,619 | 7/1982 | Gaul, Jr. | 427/228 |
| 4,342,712 | 8/1972 | Yajima et al. | 264/63 |
| 4,399,232 | 8/1983 | Yajima et al. | 501/38 |
| 4,482,669 | 11/1984 | Seyforth et al. | 524/442 |
| 4,482,689 | 11/1984 | Haluska | 528/25 |
| 4,515,742 | 5/1975 | Yajima et al. | 264/63 |
| 4,657,991 | 4/1987 | Takamizawa | 525/477 |
| 4,663,229 | 5/1987 | Yajima et al. | 428/364 |
| 4,818,611 | 4/1989 | Arai et al. | 428/364 |
| 4,820,783 | 4/1989 | Seyferth et al. | 525/478 |
| 4,869,858 | 9/1989 | Funayama et al. | 264/65 |
| 5,030,744 | 7/1991 | Funayama et al. | 556/402 |
| 5,032,551 | 7/1991 | Tashiro et al. | 528/31 |
| 5,079,323 | 1/1992 | Funayama et al. | 528/31 |
| 5,085,819 | 2/1992 | Satake et al. | 264/235 |
| 5,128,286 | 7/1992 | Funayama et al. | 528/7 |

FOREIGN PATENT DOCUMENTS

| | | |
|---|---|---|
| 0266693 | 5/1988 | European Pat. Off. . |
| 044832 | 9/1991 | European Pat. Off. . |
| 49-20206 | 2/1974 | Japan . |
| 49-69717 | 7/1974 | Japan . |
| 51-126300 | 11/1976 | Japan . |
| 52-074000 | 6/1977 | Japan . |
| 52-112700 | 9/1977 | Japan . |
| 56-9209 | 1/1981 | Japan . |
| 57-106718 | 7/1982 | Japan . |
| 57-106719 | 7/1982 | Japan . |
| 57-200210 | 12/1982 | Japan . |
| 58-132025 | 8/1983 | Japan . |
| 58-213023 | 12/1983 | Japan . |
| 58-213026 | 12/1983 | Japan . |
| 59-161430 | 9/1984 | Japan . |
| 60-99004 | 6/1985 | Japan . |
| 60-145903 | 8/1985 | Japan . |
| 62-125015 | 6/1987 | Japan . |
| 1-138105 | 5/1989 | Japan . |
| 1-138107 | 5/1989 | Japan . |
| 2-84437 | 2/1990 | Japan . |
| 2015498 | 9/1979 | United Kingdom . |

OTHER PUBLICATIONS

Ceramic Eng. Sci. Proc., 9(7-8), 931-942 (1988), Lipowitz, et al.
J. of Am. Ceram Soc., 59, 324-327(1976) Yajima, et al.
Chem. Lett. No. 9, 931-934(1975) Yajima, et al.
J. App. Poly. Sci 27, 3751-3761(1982) Penn, et al.

Primary Examiner—John Kight, III
Assistant Examiner—Rachel Johnson
Attorney, Agent, or Firm—Michael N. Meller

[57] ABSTRACT

A thermoplastic silicon-containing polymer, which may be a precursor of SiC, and which can be transformed to a thermosetting polymer by copolymerizing it with a thermosetting perhydropolysilazane or polyborosilazane.

20 Claims, No Drawings

THERMOSETTING COPOLYMERS, SILICON CARBIDE-BASED FIBER AND PROCESSES FOR PRODUCING SAME

BACKGROUND OF THE INVENTION

1. Field of the Invention

The present invention relates to a thermosetting copolymer, a silicon carbide-based fiber and processes for producing the same. This thermosetting copolymer is a copolymer of a thermoplastic silicon-containing polymer and perhydropolysilazane or polyborosilazane, and since it exhibits thermosetting property, is able to be converted directly to ceramics by pyrolysis and is useful as precursor polymer of ceramic fibers, ceramic coatings, ceramic binders, etc. This silicon carbide-based fiber is a novel inorganic fiber comprising Si, N and C as the major components and silicon carbide as the main phase, and since they have a high strength, modulus and thermal resistance, is useful as a reinforcement of various composite materials.

2. Description of the Related Art

Silicon carbide is excellent as a structural material and polycarbosilanes, polysilastyrenes, polysilanes, etc., are known as precursor polymers of the silicon carbide (Ceram. Eng. Sci. Proc., 97-8, 1988, p 931-942; and Japanese Unexamined Patent Publication (Kokai) Nos. 51-126300, 52-74000 and 52-112700). Silicon carbide fibers formed by spinning a polycarbosilane followed by curing and firing are known (J. Am. Ceram. Soc., 59, 1976, p 324-327; and Chem. Lett. No. 9, 1975, p 931-934).

Also, polytitanocarbosilane, polyzirconocarbosilane, polydisilylazane, etc., are known as precursors of silicon carbide-based ceramics such as SiC—TiC (U.S. Pat. Nos. 4,340,619, 4,321,970 and 4,482,689 and Japanese Examined Patent Publication (Kokoku) Nos. 2-33734, 2-33733, 61-58086 and 62-61220).

Silicon carbide-based fibers obtained from polytitanocarbosilane and polyzirconocarbosilane are also known (Japanese Unexamined Patent Publication (Kokai) Nos. 56-9209, 57-106718, 57-106719 and 60-99004 or U.S. Pat. Nos. 5,085,819; 4,515,742; 4,063,229; 4,342,715 and 4,399,232).

Polysilazanes and polyborosilazanes, however, are known as precursors of silicon nitride and silicon nitride-based ceramics, and the inventors have disclosed such polymers (Japanese Examined Patent Publication (Kokoku) No. 63-16325). Si—N—C—O—based ceramic fibers obtained by spinning an organic silazane followed by curing and firing are known (Japanese Unexamined Patent Publication (Kokai) Nos. 49-69717, 49-20206 and 57-200210; U.S. Pat. No. 4,482,669; and J. of Appln. Poly Sci., Vol. 27, 3751-61, (1982). Also, we disclosed silicon nitride fibers produced from perhydropolysilazane and containing a lesser amount of carbon (Japanese Unexamined Patent Publication (Kokai) No. 62-125015 or U.S. Pat. No. 4,818,611).

Since the above precursors for silicon carbide or silicon carbide-based ceramics are thermoplastic, a curing step is essential for producing a ceramic product from these precursor polymers. The curing process may be any of known such as thermal oxidation, steam treatment, γ-ray irradiation, electron beam irradiation halogen treatment, ozone treatment, etc. But use of radiation is complicated and dangerous, and further, is inefficient and also causes contamination with impurities. Particularly, oxygen introduced by the thermal oxidation damages the high temperature properties of the obtained ceramics. Further, the ceramics produced from these precursor polymers contain much free carbon and the perhydropolysilazane does not provide silicon carbide ceramics.

Silicon nitride and silicon nitride-based ceramics are candidates for high temperature structural material having an excellent strength and toughness, etc. Since silicon carbide provides a structural material having a higher strength, composites of the silicon nitride or silicon nitride-based ceramics with silicon carbide are effected to provide ceramics having more excellent properties. Further, the micro structure of the derived ceramics can be controlled by doping adequate amount of boron.

Therefore, the object of the present invention is to convert a thermoplastic polymer to a thermosetting polymer, to thereby provide a polymer which can be converted into ceramics without a curing process, more particularly, to provide a polymer useful as a precursor of composite ceramics of silicon carbide and silicon nitride. Another object of the present invention is to provide silicon carbide-based ceramic fibers having a lesser amount of oxygen and free carbon.

SUMMARY OF THE INVENTION

The above object is attained by copolymerizing a thermoplastic silicon-containing polymer and a thermosetting perhydropolysilazane or polyborosilazane, optionally with a metal compound for accelerating cross linking.

Thus, the present invention provides a block copolymer comprising a perhydropolysilazane or polyborosilazane block A and a thermoplastic silicon-containing polymer block B, said perhydropolysilazane block having a skeleton comprising a main repeating unit represented by the formula:

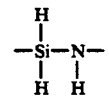

and having a number average molecular weight of 100 to 50,000, said polyborosilazane block having a main cross linkage represented by any one of the following formulae (i), (ii), (iii) and (iv):

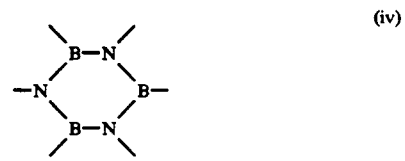

where $R^1$ stands for a hydrogen atom, halogen atom, alkyl having 1 to 20 carbon atoms, alkenyl, cycloalkyl, aryl, alkoxy, alkylamino, hydroxy or amino, and R² stands for a hydrogen atom, halogen atom and alkyl having 1 to 20 carbon atoms, and in the formula (iv), at least two of the three nitrogen atoms and three boron atoms are used for the cross linkage and the remaining atoms are bound to R¹, and having an atomic ratio of B/Si of 0.01 to 3 and a number average molecular weight of 200 to 50,000.

The present invention also provides a process for producing a thermosetting copolymer comprising reacting a perhydropolysilazane or polydorosilazane and a thermoplastic silicon-containing polymer, the perhydropolysilazane having a skeleton comprising a main repeating unit represented by the formula:

and having a number average molecular weight of 100 to 50,000, the polyborosilazane having a main cross linkage represented by any one of the following formulae (i), (ii), (iii) and (iv):

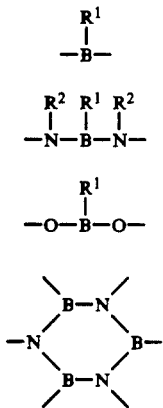

where R¹ stands for a hydrogen atom, halogen atom, alkyl having 1 to 20 carbon atoms, alkenyl, cycloalkyl, aryl, alkoxy, alkylamino, hydroxy or amino, and R² stands for a hydrogen atom, halogen atom and alkyl having 1 to 20 atoms, and in the formula (iv), at least two of the three nitrogen atoms and three boron atoms are used for the cross linkage and the remaining atoms are bound to R¹ having an atomic ratio of B/Si of 0.01 to 3 and a number average molecular weight of 200 to 50,000.

Also, the present invention provide a process for producing a thermosetting copolymer comprising the perhydropolysilazane or polyborosilazane and the thermoplastic silicon-containing polymer together with a metal compound represented by the formula $MX_n$ where M stands for at least one metal element of B, Al, Ti, Zr and Hf, X may be the same or different and stands for a hydrogen atom, halogen atom, hydroxy, carbonyl, or 1 to 20 carbon atoms-containing alkoxy, phenoxy, acetylacetoxy, alkyl, alkenyl, cycloalkyl, alkylamino or amino, and n is a valence of the metal element M, in an atomic ratio of (total Si)/M of not more than 500. The reaction product of this process is also provided by the present invention.

Further, in accordance with the present invention, there is provided a silicon carbide fiber comprising silicon, nitrogen and carbon as essential components and oxygen, hydrogen and metal elements of Al, B, Ti, Zr and Hf as optional components; having atomic ratios of N/Si of 0.01 to 1, C/Si of 0.1 to 1.5, 0/Si of not more than 0.3, M/Si of 0.002 to 0.5 where M stands for B, Al, Ti, Zr and Hf, and H/Si of not more than 0.1; substantially comprised of an amorphous phase of silicon, nitrogen and carbon or an assembly or mixture of an amorphous phase of silicon, nitrogen and carbon and a β-SiC microcrystalline phase having a crystallite size of not more than 50 nm; and having ratios of an X-ray small angle scattering intensity thereof to that of air at 1° and at 0.5° of 1 to 20, respectively.

DESCRIPTION OF THE PROPOSED EMBODIMENTS

1. Copolymer

The perhydropolysilazane or polyborosilazane used in the present invention easily reacts with many thermoplastic silicon-containing polymer having a Si—H or N—H bond only by heating, and the copolymer of perhydropolysilazane or polyborosilazane block and a thermoplastic silicon-containing polymer block has a structure in which the main skeletons of the perhydropolysilazane or polyborosilazane block and the thermoplastic silicon-containing polymer block are bound to each other, or a structure in which the side chains of these blocks are reacted to form cross linkage, or a structure in which both of these structures are combined. Thermoplastic silicon-containing polymers having a functional group easily react with perhydropolysilazane or polyborosilazane only by heating, to thereby form a bond between said functional group and the perhydropolysilazane or polyborosilazane. If the thermoplastic silicon-containing polymers do not have a functional group or have a group with a low reactivity, the thermoplastic silicon-containing polymers may be easily reacted with the perhydropolysilazane or polyborosilazane by introducing a functional group to the end group or side chain of the thermoplastic silicon-containing polymer.

The perhydropolysilazane used in the present invention is a polysilazane having a skeleton comprising the repeating unit represented by the formula:

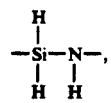

i.e., all side chains being hydrogen, and is mainly a linear polymer but may contain a cyclic portion, and further, a cross-linking structure.

Such a perhydropolysilazane may be oligomers obtained by ammonolysis of an adduct of dihalosilane with a Lewis base (Japanese Examined Patent Publication (Kokoku) No. 63-16325 or U.S. Pat. No. 4,818,611). The dihalosilanes and Lewis bases as well as the reaction conditions that can be used are the same as or similar to these mentioned in U.S. Pat. Nos. 4,869,858. Also, inorganic polymers obtained by heating said oligomers in a basic solution (Japanese Unexamined Patent Publication (Kokai) No. 1-138105) may be used. By heating, intermolecular and intramolecular reaction of perhydropolysilazanes occur, and results a increasing of the polymerization degree. Reformed polysilazanes obtained by reacting said oligomer with ammonia, etc.

(Japanese Unexamined Patent Publication (Kokai) No. 1-138107) also may be used as the perhydropolysilazane. By reacting with ammonia, the perhydropolysilazanes are cross-linked through ammonia, thus increasing the polymerization degree.

Since the perhydropolysilazane is highly reactive because of their Si—H and N—H bonds, it is easy to make a copolymer, and it is a thermosetting polymer, the perhydropolysilazane is suitable for the purpose of the present invention. The perhydropolysilazane is also beneficial, since of the perhydropolysilazane does not contain carbon atoms in the repeating unit. It prevents free carbon in the silicon carbide obtained from a copolymer thereof.

The number average molecular weight of the used perhydropolysilazane is in a range of 100 to 50,000, preferably 600 to 10,000. If the molecular weight is smaller than this, the ceramic yield of the copolymer is low, and if the molecular weight is too high, the polymer forms gel.

The polyborosilazane used in the present invention may be a polyborosilazane obtained by reaction of a polysilazane having a skeleton comprising a main repeating unit represented by the formula (I):

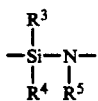

where, $R^3$, $R^4$ and $R^5$ independently stand for a hydrogen atom, alkyl, alkenyl, cycloalkyl, aryl, aralkyl, alkylsilyl, alkylamino, or alkoxy, provided that at least one of R , R and R: is a hydrogen atom, preferably all of $R^3$, $R^4$ and $R^5$ are hydrogen atoms, and having a number average molecular weight of about 100 to 50,000, with a boron compound represented by the formula (II), (III), (IV) or (V):

$$B(R^6)_3 \quad (II)$$

$$(R^6BO)_3 \quad (III)$$

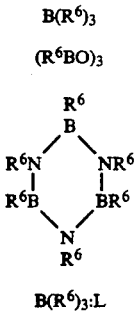

$$B(R^6)_3 {:} L \quad (V)$$

where $R^6$ may be the same or different and stands for a hydrogen atom, halogen atom, or 1 to 20 carbon atoms-containing alkyl, alkenyl, cycloalkyl, aryl, alkoxy, alkylamino, hydroxy or amino, and L stands for a compound forming a complex with $B(R^6)_3$, said polyborosilazane having an atomic ratio of boron/silicon of 0.01 to 3 and a number average molecular weight of about 200 to 50,000 (Japanese Unexamined Patent Publication No. 2-84437 or U.S. Pat. No. 5,030,744)

Of $B(R^6)_3$, examples of those which have a halogen atom or atoms as $R^6$ include fluoroborane, tribromoborane, trifluoroborane, trichloroborane, difluoroborane, diiodoborane, iodoborane, dibromomethylborane, dichloromethylborane, difluoromethylborane, difluoromethoxyborane, diiodomethylborane, ethynyldifluoroborane, difluorovinylborane, dibromoethylborane, dichloroethylborane, dichloroethoxyborane, ethyldifluoroborane, ethyldiiodoborane, bromodimethylborane, dibromo(dimethylamino)borane, chlorodimethylborane, chlorodimethoxyborane, fluorodimethylborane, fluorodimethoxyborane, dichloroisopropylborane, dichloropropylborane, difluoropropoxyborane, bromo(dimethylamino)methylborane, chlorodivinylborane, dibromobutylborane, butyldichloroborane, butyldifluoroborane, butoxydifluoroborane, bromodiethylborane, dibromo(diethylamino)borane, chlorodiethylborane, chlorodiethoxyborane, dichloro(pentafluorophenyl)borane, dichloro(diethylamino)borane, (diethylamino)difluoroborane, bromobis(dimethylamino)borane, chlorobis(dimethylamino)borane, bis(dimethylamino)fluoroborane, dibromophenylborane, dichlorophenylborane, difluorophenylborane, difluorophenoxyborane, diiodophenylborane, dibromo(1,3-dimethyl-1-butenyl)borane, dibromo(3,3-dimethyl-1-butenyl)borane, dibromo(1-ethyl-1-butenyl)borane, dibromo-1-hexenylborane, dibromo(2-methyl-cyclopentyl)borane, 2-methylcyclopentyl-dichloroborane, dibromohexylborane, dibromo(2-methylpentyl)borane, difluoro borane, dibromo(dipropylamino)borane, chlorodipropylborane, chloro(1,1,2-trimethyl-propyl)borane, dichloro(diisopropylamino)borane, butyl(dimethylamino)fluoroborane, dichloro(4-methylphenyl)borane, dichloro(methylphenylamino)borane, bromo(dimethylamino)phenylborane, chloro(dimethylamino)phenylborane, 9-bromo-9-borabicyclo[3,3,1] nonane, 9-chloro-9-borabicyclo[3,3,1] nonane, diethylaminochloro-(1-butenyloxy)borane, dichlorooctylborane, bromobis(1-methylpropyl)borane, bromodibutylborane, dibromo(dibutylamino)borane, chlorobis(2-methylpropyl)borane, dibutylchloroborane, dichloro(dibutylamino)borane, dibutylfluoroborane, bromobis(biethylamino)borane, chloro-bis(diethylamino)borane, dichloro(2,4,6-trimethylphenyl)borane, 3-bromo-7-methyl-3-borabicyclo[3,3,1] nonane, (diethylamino)chloro-(cyclopentenyloxy)borane, dichloro(1,2,3,4,5-pentamethyl-2,4-cyclopentadien-1-yl)borane, dibromo(1,2,3,4,5-pentametyl-2,4-cyclopentadien-1-yl)borane, diiodo(1,2,3,4,5-pentamethyl-2,4-cyclopentadien-1-yl)borane, chlorodicyclopentylborane, chloro(diethylamino)phenylborane, bromodicyclopentylborane, (1-butyl-1-hexenyl)di-chloroborane, bromodipentylborane, chlorodiphenylborane, bromodiphenylborane, dichloro(diphenylamino)borane, chloro(di-isopropylamino)phenylborane, chloro(dipropylamino)phenylborane, bromobis(2-bromo-1-chlorobis(2-chloro-1-hexenyl)borane, chlorodicyclohexylborane, chlorodi-1-hexenylborane, chloro(1-ethyl-1-butenyl)(1,1,2-trimethylpropyl)borane, chloro-1-hexenyl(1,1,2-trimethylpropyl)borane, [methyl(4-bromophenyl)amino] chloro(phenyl)borane, chloro-(2-phenylethynyl)(1,1,2-trimethylpropyl)borane, chloro(dibutylamino)phenylborane, chlorooctyl(1,1,2-trimethylpropyl)borane, chlorobis(dibutylamino)borane, fluorobis(2,4,6-trimethylphenyl)borane, (1-bromo-1-hexenyl)bis(2-methylpentyl)borane, (1-bromo-1-hexenyl)dihexylborane, bis(1-butyl-1-hexenyl)chloroborane, and (5-chloro-1-pentenyl)bis(1,2-dimethylpropyl)borane.

Examples of the boron compounds wherein $R^6$ is an alkoxy group include dihydroxymethoxyborane, dimethoxyborane, methoxydimethylborane, methyldimethoxyborane, trimethoxyborane, ethyldimethoxyborane, dimethylaminomethoxymethylborane, (dimethylamino)dimethoxyborane, diethylmethoxyborane, dimethoxypropylborane, bis(dimethylamino)methoxyborane, ethoxydiethylborane, butyldimethoxyborane, diethoxyethylborane, triethoxyborane, cyclopentyldimethoxyborane, methoxydipropylborane, dimethoxyphenylborane, (2-methylcyclopentyl)dimethoxyborane, butoxydiethylborane, ethoxydipropylborane, hexyldimethoxyborane, 3-methoxy-3-borabicyclo[3,3,1] nonane, 9-methoxy-9-borabicyclo[3,3,1] nonane, di-butylmethoxyborane, methoxybis(1-methylpropyl)borane, methoxybis(2-methylpropyl)borane, propoxydipropylborane, triisopropoxyborane, tripropoxyborane, butoxydipropylborane, dibutylethoxyborane, diethyl(hexyloxy)borane, dibutoxyethylborane, di-tert-butoxyethylborane, dicyclopentylmethoxyborane, dibutylpropoxyborane, ethoxydipentylborane, (hexyloxy)dipropylborane, tributoxyborane, tri-tert-butoxyborane, tris(2-butoxy)borane, tris(2-methylpropoxy)borane, methoxydiphenylborane, dicyclohexyl(methoxy)boran, dibutyl(2-penten-3-yloxy)borane, dibutoxypentylborane, ethoxydiphenylborane, (2-aminoethoxy)diphenoxyborane, dibutyl(1-cyclohexenyloxy)-borane, butoxydipentylborane, dibutyl(hexyloxy)borane, dibutoxyhexylborane, dihexyloxypropylborane, tripenyloxyborane, butoxydiphenylborane, (2-methylpropoxy)diphenylborane, diphenoxyphenylgorane, triphenoxyborane, tricyclohexyloxyborane, methoxybis-(2,4,6-trimethylphenyl)boranne, tribenxyloxyborane, tris(3-methylphenoxy)borane, trioctyloxyoxyborane, trinonyloxyborane and trioctadecyloxyborane.

Examples of the boron compounds wherein $R^6$ is an alkenyl group include ethynylborane, vinylborane, diphydroxyvinylborane, 2-propenylborane, ethynyldimethoxyborane, methyldivinylborane, trivinylborane, 1-hexenyldihydroxyborane, dimethoxy(3-methyl-1,2-buradienyl)borane, diethyl-2-propenylborane, dihydroxy(2-phenylethenyl)borane, (diethylamino)diethynylborane, diethylaminodi-1-propynylborane, 2-butenyldiethylborane, diethyl(2-methyl-2-propenyl)borane, bis (dimethylamino) (1-methyl-2-propenyl)borane, 2-butenylbis (dimethylamino)borane, tri(2-propenyloxy)borane, diethyl(3-methyl-2-butenyl)borane, 2-propenyldipropylborane, (diethylamino)di-1-propynylborane, butyldi-2-propenylborane, 2-butenyldipropylborane, diethyl(1-ethyl-2-butenyl)borane, (2-methyl-2-propenyl)dipropylborane, diethyl(1,1-dimethyl-3-buten-1-yloxy)borane, diethyl(1,1-hexen-4yloxy)borane, 9-(2-propenyl)-9-borabicyclo[3,3,1] nonane, dibutyl-2-propenyl-boran, (3-methyl-2-butenyl)dipropylborane, 9-(2-butenyl)-9-borabicyclo[3,3,1] nonane, tri-2-butenylborane, tris(2-methyl-2-propenyl)borane, hexyldi-2-propenylborane, 2-butenyldibutylborane, bis(1,2-dimethylpropyl)(2-phenylethenyl)borane, and bis(1,2-di-methylpropyl)-1-octenylborane.

Examples of the boron compounds wherein $R^6$ represents an alkylamino group or an amino group include aminoborane, diaminoborane, aminodimethylborane, (dimethylamino)borane, dimethyl(methylamino)borane, methylbis(methylamino)borane, tris-(methylamino)borane, (dimethylamino)dimethylborane, bis(dimethylamino)methylborane aminodispropylborane, (diethylamino)dimethylborane, (dimethylamino)-diethylborane, tris(dimethylamino)borane, isopropylbis(dimethylamino)borane, dimethyl(phenylamino)borane, bis(methylamino)phenylborane, bis(dimethylamiino)-1-pyrrolylborane, aminodibutylborane, diethylaminodiethylborane, dimethylaminodipropylborane, bis(dimethylamino)phenylborane, dibutyl(dimethylamino)borane, di-tert-butyl(dimethylamino)borane, dibutyl(diethylamino)borane, tris(diethylamino)borane, tris(ethylamino)borane, dimethylaminodiphenylborane and aminobis(2,4,6-trimethylphenyl)borane.

Examples of the boron compounds wherein $R^6$ represents a hydroxy group include boric acid, hydroxyborane, dihydroxy(methyl)borane, hydroxydimethylborane, ethyldihydroxyborane, dihydroxypropylborane, 2-furanyldihydroxyborane, diethylhydroxyborane, butyldihydroxyborane, cyclopentyldihydroxyborane, pentyldihydroxyborane, (3-aminophenyl)dihydroxyborane, phenyldihydroxyborane, heptyldihydroxyborane, dihydroxy(2-phenylethyl)borane, dihydroxy(1-naphthalenyl)borane, hydroxybis(2,4,6-trimethylphenyl)borane and hydroxydiphenylborane.

Examples of the boron compounds wherein $R^6$ represents an alkyl group include methylborane, dimethylborane, ethylborane, trimethylborane, diethylborane, ethyldimethylborane, diethylmethyborane, 3-methyl-2-butylbrane, triethylborane, (1,1,2-trimethylpropyl)borane, dibutylborane, triisopropylborane, tripopylborane, bis(3-methyl-2-butyl)borane, bis(1,1,2-tri-methylpropyl)borane, tri-tert-butylborane, tributylborane, tris(1-methylpropyl)-borane, tris(2-methylpropyl)borane, tripentylborane, tris(1,2-dimethylpropyl)borane, trihexylborane and trioctylborane.

Examples of the boron compounds wherein $R^6$ represents a cycloalkyl group include cyclopentylborane, cyclohexylborane, dicyclohexylborane, cyclohexyl(1,1,2-trimethylpropoyl)borane, tricyclopentylborane, and tricyclohexylborane.

Examples of the boron compounds wherein $R^6$ represents an aryl group include tri-1-naphthylborane, tris(2,4,6-trimethylphenyl)borane, tribenzylborane, tris(4-methylphenyl)borane, triphenylborane, phenylborane and ethyldiphenylborane.

An example of the boron compound wherein $R^6$ represents a hydrogen atom is borane.

Examples of $(R^6BO)_3$ include boroxine, trifluoroboroxine, trimethylboroxine, trimethoxyboroxine, triethylboroxine, triethoxyboroxine, triphenylboroxine, triphenoxyboroxine, tris-(4-ethenylphenyl)-boroxine, tris(dimethylamino)boroxine, tributylboroxine, tributoxyboroxine, and tricyclohexyboroxine.

Examples of

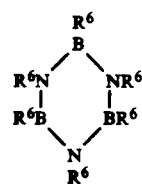

(IV)

include 2,4,6-trichloroborazine, 2,4,6-tribromoborazine, 2,4,6-trifuoroborazine, borazine, 1-methlborazine, 2,4,6-trichloro-1,3,5-trimethylborazine, 2,4,6-trifluoro-1,3,5-trimethylborazine, 1,3,5-trimethylborazine, 2,4,6-trimethylborazine, 2,4,6-trimethoxyborazine, 2,4-dichloro-1,3,5,6-tetramethylborazine, 2-chloro-1,3,4,5,6-pentamethylborazine, 2,4,6-trichloro-1,3,5-triethylborazine, hexamethylborazine, 1,3,5-triethylborazine, 4,6-triethylborazine, 1,3,5-tripropylborazine, 2,4,6-triethyl-1,3,5-trimethylborazine, 1,3,5-tributyl-2,4,6-trichloroborazine, hexaethylborazine, 2,4,6-trichloro-1,3,5-triphenylborazine, 2,4,6-triphenylborazine, 2,4,6- tri-(diethylamino)borazine, 2,4,6-tri(bis(trimethylsilyl-)amino)borazine, 2,4,6-tris(dimethylamino)-1,3,5-trimethylborazine, and 1,3,5-trimethyl-2,4,6-triphenylborazine.

Examples of $B(R^6)_3:L$ include borane-phosphine, borane-hydrazine, trifluoroborane-methanol, cyanoborane-ammonia, difluoroborane-methylamine, borane-methylamine, tribromoborane-dimethylsulfide, trichloroborane-dimethylsulfide, trifluoroborane-dimethyl ether, trifluoroborane-ethanol, borane-isocyanomethane, dibromoborane-dimethylsulfide, dichloroborane-dimethyl-sulfide, trichloroborane-dimethylamine, trifluoroborane-ethylamine, cyanoborane-methylamine, bromoborane-dimethylsulfide, chloroborane-dimethylsulfide, difluoroborane-dimethylamine, iodoborane-dimethylsulfide, chloroborane-dimethylamine, borane-dimethylamine, borane-dimethylphosphine, tribromoborane-trimethylphosphine, tribromoborne-trimethylamine, trichloroborane-trimethylamine, trichloroborane-trimethlphosphine, trifluoroborane-trimethylamine, trifluoroborane-trimethylphosphine, triodoborane-trimethtlphosphine, cyanoborane-dimethylamine, difluoroborane-trimethylamine, bromoborane-trimethylphosphine, chloroborane-trimethylphosphine, fluoroborane-trimethylamine, iodoborane-trimethtlphosphine, borane-trimethylamine, trimethylborane-ammonia, trimethoxyborane-ammonia, borane-trimetylphosphite, borane-trimethylphosphine, trifluoroborane-2-methylimidazole, trifluoroborane-tetrahydrofuran, chloroborane-tetrahydrofuran, trichloroborane-diethyl ether, trifluoroborane-diethyl ether, dibromoborane-diethyl ether, dichloroborane-diethyl ether, cyanoborane-trimethylamine, bromoborane-diethyl ether, dibromoborane-trimethylamine, dibromomethylborane-trimethylphosphine, chloroborane-diethyl ether, borane-tertbutylamine, borane-diethylamine, tribromoborane-pyridine, trichloroborane-pyridine, trifluoroborane-pyridine, borane-pyridine, borane-4-aminopyridine, bromodimethylborane-trimethylphosphine, dichlorocyanoborane-pyridine, trifluorborane-phenol, cyanoborane-pyridine, dibromomethylborane-pyridine, borane-4-methylpyridine, trifluoroborane-1-hexanol, tribromoborane-triethylamine, trichloroborane-triethylamine, chloroborane-triethylamine, borane-triethylamine, trimethylborane-trimethylamine, borane-tris(dimethylamino)phosphine, trifluoroborane-methoxybenzene, trifluoroborane-4-methylaniline, borane-2,6-dimethylpyridine, trifluoroborane-dibutyl ether, phenyldichloroborane-triethylamine, tribromoborane-triphenylphosphine, trichloroborane-triphenylphosphine, trifluoroborane-triphenylphosphine, borane-triphenylamine, borane-triphenylphosphine, trimethylborane-triphenylamine, triphenylborane-trimemethylamine, triphenylborane-pyridine, and triphenylborane-triethylamine. In addition to the above-described compounds, tetraborane (10), pentaborane (9), pentaborane (11), hexaborane (10), hexaborane (12), octaborane (12), octaborane (18), isononaborane (15), nonaborane (15), decaborane (14), 1,1'-bipentaborane (9), 1,2'-bipentaborane (9), 2,2'-bipentaborane (9), 1-carbohexaborane (7), 2-carbahexaborane (9), 1,2-dicarbahexaborane (6), 1,2-dicarbaheptaborane (7), 2,4-dicarbaheptaborane (7), 2,3-dicarbahexaborane (8), 1,7-dicarbaoctaborane (8), 1,2-dicarbadodecaborane (12), 1,7-dicarbadodecarbane (12) and 1,12-dicarbadodecarborane (12) can offer good results.

Most of these boron compounds are commercially available, and those which are not commercially available can be prepared in the same manner as with the conventionally available ones.

The polysilazane and boron compound are reacted with each other preferably in a solvent at a temperature of 400° C. or less in a dry inert atmosphere.

The number average molecular weight of the used polyborosilazene is in a range of 200 to 50,000, preferably 600 to 10,000. If the molecular weight is too low, the yield of ceramics from the copolymer is low, and if the molecular weight is too high, the polymer forms gel.

The thermoplastic silicon-containing polymer used in the present invention may be polysilane, polycarbosilane, polysiloxane, polysilazane, or the like, having a skeleton containing silicon, and preferably are precursor polymers for silicon carbide-based ceramics such as polycarbosilane, polysilastyrene, polycarbosilastyrene, methylpolysilane, phenylpolysilane, polytitanocarbosilane, polyzirconocarbosilane, polydisilylazane, or the like. These polymers, if having a group reactive with perhydropolysilazane or polyborosilazene, forms a copolymer with the perhydropolysilazane or polyborosilazane by mixing and heating them. Such a reactive group includes amido, imido, hydrosilyl, hydroxy, alkoxy, carboxyl, keto, halogen atom, epoxy, etc.

The number average molecular weight of the thermoplastic silicon-containing polymer is in a range of 100 to 50,000, preferably 300 to 10,000. If the molecular weight is smaller than 100, the polymer evaporates during the reaction and the yield of the polymer is lower. If the molecular weight is higher than 50,000, the copolymer would form gel.

As described above, many thermoplastic silicon-containing polymer and perhydropolysilazane or polyborosilazane react with each other by heating a mixture thereof. Normally a solvent is used and the solvent may be any one that does not react with the thermoplastic silicon-containing polymer, perhydropolysilazane and polyborosilazane, for example, halogenated hydrocarbon such as methylene chloride, chloroform, carbon tetrachloride, bromoform, ethylene chloride, ethylidene chloride, trichloroethane and tetrachloroethane, ethers such as ethylether, isopropylether, ethylbutylether, butylether, 1,2-dioxyethane, dioxane, dimethyldioxane, tetrahydrofuran, and tetrahydropyran, and other hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene.

For the purpose of obtaining high molecular weight polyborosilazanes, it is advisable to perform the reaction of the polysilazane with the boron compound under a basic condition. By the term "basic condition" is meant a condition in the presence of a basic compound such as a tertiary amine, a secondary amine having a group with a steric hindrance or a phosphine. Such a basic condition can be established by adding the basic compound to the reaction mixture or by using, as a reaction solvent, a basic solvent or a mixture of a basic solvent and a non-basic solvent mentioned above. Such a basic compound is used in an amount of at least 5 parts by weight, preferably at lest 20 parts by weight, per 100 parts by weight of the reaction solvent. If the amount of the basic compound is less 5 parts by weight, a markedly high molecular weight product can not be obtained.

Any basic solvent may be employed as long as it does not decompose the polysilazane and boron compound. Examples of the basic solvent include trialkylamines such as trimethylamine, dimethylethylamine, diethylmethylamine and triethylamine, tertiary amines such as pyridine, picoline, dimethylaniline, pyrazine, pyrimidine, pyridazine and derivatives thereof, pyrrole, 3-pyrroline, pyrazole, 2-pyrazolyl, and a mixture thereof.

The reaction temperature is preferably in a range of 0 to 300° C., and a reaction time of not more than 30 minutes is normally sufficient.

Also, a metal compound may be further added to the above starting polymers to form cross-linkages, whether or not the thermoplastic silicon-containing polymer has a group reactive with the perhydropolysilazane or polyborosilazane.

The metal compound for forming cross-linkage may be, for example, halides, hydroxides, alkylated compounds, alkoxides, acetylacetanates, metallocenes or the like of B, Al, Ti, Zr, Hf, etc. These metal compounds reacts with the hydrogen atom bound to the silicon or nitrogen atom of the perhydropolysilazane or polyborosilazane and with the side chain of the thermoplastic silicon-containing polymer, to form mainly a cross linkage binding the silicon or nitrogen atom of the perhydropolysilazane or polyborosilazane and the skeleton-composing atom such as silicon atom of the thermoplastic silicon-containing polymer through the metal atom. Alternatively, the cross-linkage may be formed with the reactive side chain of the thermoplastic silicon-containing polymer. By introducing such cross-linkages, the obtained copolymer retains the thermosetting property of the perhydropolysilazane or polyborosilazane more effectively.

The amount of the metal compound for forming cross-linkage is preferably in an amount such that the atomic ratio of the metal atom to the total silicon atoms of the starting polymers is not more than 500, more preferably not more than 300.

Thus, according to the present invention, there are provided a thermosetting copolymer obtained by direct bond between the thermoplastic silicon-containing polymer and perhydropolysilazane or polyborosilazane as well as a thermosetting copolymer obtained by reaction of the thermoplastic silicon-containing polymer and perhydropolysilazane or polyborosilazane together with the metal compound. The number average molecular weight of the obtained copolymer is generally 200 to 500,000 when the perhydropolysilazane is used and 300 to 500,000 when the polyborosilazane is used. If this molecular weight is too large, the copolymer would form gel and it is very difficult to dissolve the copolymer in a solvent. If this molecular weight is too small, the ceramic yield of the copolymer would be small.

The ratio between the perhydropolysilazane or polyborosilazane block and the thermoplastic silicon-containing polymer of the obtained thermosetting copolymer is not particularly limited as long as the copolymer exhibits a thermosetting property, but the ratio of the silicon atoms contained in the respective blocks is generally not less than 0.5, more preferably not less than 1. By increasing this ratio, the thermosetting perhydropolysilazane or polyborosilazane block prevents the softening of the thermoplastic block, to thereby provide a thermosetting copolymer.

The thus obtained thermosetting copolymer is soluble in an organic solvent and can easily form a shaped precursor body and can be converted into a shaped ceramic body. The content of free carbon in the ceramics can be controlled by selecting the composition of the polymers, and the introduction of any impurities during the curing step can be prevented.

In comparison with SiC obtained from a silicon carbide precursor polymer, the SiC obtained from the thermosetting copolymer of the present invention maintains its amorphous state to microcrystalline structure up to a higher temperature due to N and B introduced in SiC.

Accordingly, the high temperature strength of a structural material obtained from a preceramic polymer can be improved. The introduction of B to the SiC-based ceramics allows control of the microstructure.

The thermosetting copolymer as a ceramic precursor may be used in any way, including directly forming the copolymer into a shape, followed by firing, infiltration of the copolymer into a preform, followed by firing; using the copolymer as a binder, followed by firing; or others.

The solid copolymer is first dissolved in a solvent and the viscosity is adjusted by removing the excess solvent. Then, the copolymer solution is formed into a shape such as a fiber or a film, infiltrated into a preform, or mixed with ceramic powders. The solvent is removed, if necessary, and the copolymer is pyrolyzed. The liquid copolymer is formed into a shape such as a fiber or a film, infiltrated into a preform or mixed with ceramic powders, followed by heat curing and then pyrolyzed same.

The pyrolysis of the copolymer is conducted in an atmosphere such as He, Ar, $N_2$, $H_2$ or mixture thereof at 600° C. to 1800° C. The pressure may be reduced or increased, if necessary.

2. Ceramic Fiber

By dry spinning a solution containing said thermosetting copolymer of the perhydropolysilazane or polyborosilazane and the thermoplastic silicon-containing polymer into a fiber of the thermosetting copolymer, and firing the thermosetting copolymer fiber, under tension or without tension, in a gas flow of Ar, $N_2$, $H_2$ or a mixture thereof, optionally under a increased or reduced pressure, at 600 to 1800° C., a novel silicon carbide-based fiber substantially comprised of silicon, nitrogen and carbon.

The silicon carbide-based fiber of the present invention is an inorganic fiber comprising silicon, nitrogen and carbon as the essential components and oxygen, hydrogen and metal elements selected from Al, B, Ti, Zr and Hf as the optional components. The fiber may be crystalline or amorphous but is preferably a fiber which is essentially amorphous. Namely, a fiber which is amorphous or contains only a microcrystalline phase ($\beta$-SiC) having a crystallite size of less than 50 nm in all direction (measured by the X-ray diffraction half valve width method (JONES)) is preferred.

The ratios of the elements constituting the silicon carbide-based fiber of the present invention is, in the term of the atomic ratio, generally

| | |
|---|---|
| N/Si | 0.01 to 1 |
| C/Si | 0.1 to 1.5 |
| O/Si | 0.3 or less |
| M/Si | 0 to 0.5, |
| preferably | |
| N/Si | 0.05 to 0.8 |
| C/Si | 0.2 to 1.2 |
| O/Si | 0.25 or less |

| | -continued |
|---|---|
| M/Si | 0 to 0.3, |
| more preferably | |
| N/Si | 0.1 to 0.7 |
| C/Si | 0.5 to 1.0 |
| O/Si | 0.2 or less |
| M/Si | 0 to 0.2. |

If the elements ratio are not in the above ranges, the tensile strength, modulus and thermal resistance of the fiber are lowered.

The metal M is selected from Al, B, Ti, Zr and Hf.

According to the investigation by the present inventors, it was found that it is extremely advantageous if the ceramic fiber has a certain small angle X-ray scattering intensity. That is, the small angle scattering intensities at 1° and 0.5° should be 1 to 20 times those of the air. The preferable small angle scattering intensity ratio is 1 to 10, more preferably 1 to 5.

The X-ray small angle scattering intensity of the fiber indicates the presence of micropores, i.e., void or vacancy, inside the inorganic fiber. If there are micropores in an inorganic fiber, the X-ray small angle scattering is observed from the uneven distribution of the electron density in the system. The measurement of the X-ray small angle scattering is generally conducted in accordance with the procedure described in "Experimental Chemistry Lectures 4 - Solid Physics" edited by the Japan Chemistry Society (1956), and the following procedure was adopted in the measurement of the silicon carbide-based fiber of the present invention.

An X-ray diffraction unit RJ-200B type (Rigaku Denki K.K.) was provided with PSPC (position sensing proportion counter), using a tube voltage of 45 kV, a tube current of 95 mA and first and second slits with 0.2 mm$\phi$ and 0.15 mm$\phi$ respectively. The scattering intensity was measured at every 0.02° and counted as an integral for 1000 seconds. The sample was 18 mg of fibers with a cut length of 15 mm attached in slits of 10 mm long and 4 mm wide. The scattering intensity was measured at 1° and 0.5°, respectively. Thus, the ratios of the scattering intensity of the fiber to that of the air, i.e., I(Silicon carbide-based fiber)/I'(air), were counted for 1° and 0.5° of the scattering angles respectively.

The thermosetting copolymer is spun and fired. If the copolymer is solid, the copolymer is dissolved in a solvent and the solvent is removed to adjust the adequate viscosity, followed by spinning. If it is liquid, the copolymer is spun and thermally cured, and then the spun fiber is pyrolyzed.

The spun fiber of the copolymer of the present invention does not need curing process, since the copolymer is thermosetting, and by eliminating the curing step, not only is the process simplified, but also an introduction of oxygen into a fiber during the curing step can be prevented, so that the final silicon carbide based fiber a high quality.

Thus, the spun fiber is fired, under a tension of typically 1 g/mm$^2$ to 50 kg/mm$^2$ or without tension, in a gas flow of Ar, N$_2$, H$_2$ or a mixture thereof, optionally at a pressed or reduced pressure, at 600 to 1800° C., to obtain a ceramic fiber.

The silicon carbide-based fiber of the present invention comprises an amorphous phase or a mixture of an amorphous phase and $\beta$-SiC microcrystallites having a crystallite size not more than 50 nm, and has ratios of the X-ray small angle scattering intensity to that of the air at 1° and 0.5° respectively of 1 to 20. As a result, this ceramic fiber has an excellent high temperature strength. Also, the silicon carbide-based fiber has an excellent high temperature strength, hardness and thermal conduction, and is semiconducting, due to the basicity of silicon carbide, and may be a ceramic fiber with lesser free carbon, which makes the silicon carbide-based fiber suitable for a reinforcement of a composite material. When the silicon carbide-based fiber contains boron, the microstructure can be controlled by the boron and an improved silicon carbide-based fiber can be obtained.

EXAMPLES

1. Preparation of perhydropolysilazane

Reference example 1

A four necked flask having a volume of 1 liter was provided with a gas inlet, a mechanical stirrer and a Dewar condenser. The inside of the reactor was substituted by dry nitrogen which has been subjected to oxygen removal. Then, 490 ml of degassed dry pyridine was charged in the four necked flask and cooled by ice, 51.6 g of dichlorosilane was added to form white solid adduct, SiH$_2$Cl$_2$·2C$_2$H$_5$N, and 51.0 g of Ammonia refined through a sodium hydroxide and an activated carbon tube was blown into the reaction mixture while cooling and stirring.

After completion of the reaction, the reaction mixture was centrifuged, washed with dry pyridine and then filtered in a nitrogen atmosphere to obtain 850 ml of a filtrate. When the solvent was removed by evacuation from 5 ml of the filtrate, 0.102 g of resinous solid perhydropolysilazane was obtained.

The number average molecular weight of the obtained polymer was found to be 980 by gel permeation chromatography (GPC). The infrared (IR) spectrum (solvent: dry o-xylene; concentration of perhydropolysilazane: 10.2 g/l) of the polymer included absorptions by NH at wavenumbers 3350 cm$^{-1}$ (apparent absorption coefficient $\epsilon=0.557$ l/gcm) and 1175 cm$^{-1}$, absorption by SiH at a wave number of 2170 cm$^{-1}$ ($\epsilon=3.14$), and absorptions by SiH and SiNSi at 1020 cm$^{-1}$ to 820 cm$^{-1}$. Also, the $^1$HNMR (proton nuclear magnetic resonance) spectrum (60 MHz, solvent CDCl$_3$/standard TMS) of the polymer indicated a wide range of absorptions, with absorptions of $\delta$4.8 and 4.4 (br, SiH) and $\delta$1.5 (br, NH).

Reference example 2

100 ml of a pyridine solution of perhydropolysilazane obtained in Reference example 1 (concentration of perhydropolysilazane: 5.04% by weight) was charged in an autoclave having a volume of 300 ml, to which 2.8 g (0.165 mol) of refined anhydrous ammonia was added, and the reaction was conducted in this closed system at 60° C. for 3 hours while stirring. The pressure was raised by 1.2 kg cm$^2$ after the reaction. The reaction mixture was cooled to the room temperature, 200 ml of dry o-xylene was added, and the solvent was removed at 3 to 5 mmHg and 50 to 70° C., to thereby obtain 5.22 g of white powder. The powder was soluble in toluene, tetrahydrofuran, chloroform and other organic solvents.

The number average molecular weight of the above polymer powder was 1740, by GPC. The IR spectrum (solvent: o-xylene) showed absorptions by NH at wave numbers of 3350 cm$^{-1}$ and 1175 cm$^{-1}$ absorption by SiH at 2170 cm$^{-1}$, and absorptions by SiN and SiNSi at 1020 to 820 cm$^{-1}$. The HNMR spectrum (CDCl$_3$, TMS) of the polymer powder showed wide absorptions, with absorptions at δ4.8 (br, SiH$_2$), δ4.4 (br, SiH$_3$) and δ1.5 (br, NH). (SiH$_2$)/(SiH$_3$) =4.1.

Reference example 3

100 ml of a pyridine solution of perhydropolysilazane obtained in Reference example 1 (concentration of perhydropolysilazane: 5.24% by weight) was charged in an autoclave having a volume of 300 ml and the reaction was conducted in this closed system at 100° C. for 3 hours while stirring. During the reaction, a massive gas was formed. The pressure was raised by 1.0 kg cm$^2$ after the reaction. The reaction mixture was cooled to the room temperature, 200 ml of dry ethylbenzene was added, and the solvent was removed at 3 to 5 mmHg and 50 to 70° C., to thereby obtain 4.68 g of white powder. The powder was soluble in toluene, tetrahydrofuran, chloroform and other organic solvents.

The number average molecular weight of the above polymer powder was 2070, by GPC. The IR spectrum (solvent: ethylbenzene) showed absorptions by NH at wave numbers of 3350 cm$^{-1}$ and 1175 cm$^{-1}$, absorption by SiH at 2170 cm$^{-1}$, and absorptions by SiN and SiNSi at 1020 to 820 cm$^{-1}$. The HNMR spectrum (CDCl$_3$, TMS) of the polymer powder showed wide absorptions, with absorptions of δ4.8 (br, SiH$_2$), δ4.4 (br, SiH$_3$) and δ1.5 (br, NH). (SiH$_2$)/(SiH$_3$) =4.1.

Reference example 4

100 ml of a pyridine solution of perhydropolysilazane obtained in Reference example 1 (concentration of perhydropolysilazane: 5.04% by weight) was charged in an autoclave having a volume of 300 ml, to which 2.8 g (0.165 mol) of refined anhydrous ammonia was added, and the reaction was conducted in this closed system at 80° C. for 6 hours while stirring. The pressure was raised by 1.2 kg cm$^2$ after the reaction. The reaction mixture was cooled to the room temperature, 200 ml of dry o-xylene was added, and the solvent was removed at 3 to 5 mmHg and 50 to 70° C., to thereby obtain 5.22 g of white powder. The powder was soluble in toluene, tetrahydrofuran, chloroform and other organic solvents.

The number average molecular weight of the above polymer powder was 2440, by GPC. The IR spectrum (solvent: o-xylene) showed absorptions by NH at wave numbers of 3350 cm$^{-1}$ and 1175 cm$^{-1}$, absorption by SiH at 2170 cm$^{-1}$, and absorptions by SiN and SiNSi at 1020 to 820 cm$^{-1}$. The HNMR spectrum (CDCl$_3$, TMS) of the polymer powder showed wide absorptions, with absorptions of δ4.8 (br, SiH$_2$), δ4.4 (br, SiH$_3$) and δ1.5 (br, NH). (SiH$_2$)/(SiH$_3$) =4.1.

Reference example 5

100 ml of a pyridine solution of perhydrospolysilazane obtained in Reference example 1 (concentration of perhydropolysilazane: 5.24% by weight) was charged in an autoclave having a volume of 300 ml and the reaction was conducted in this closed system at 120° C. for 3 hours while stirring. During the reaction, a massive gas was formed. The pressure was raised by 1.0 kg cm$^2$ after the reaction. The reaction mixture was cooled to the room temperature, 200 ml of dry ethylbenzene was added, and the solvent was removed at 3 to 5 mmHg and 50 to 70° C., to thereby obtain 4.68 g of white powder. The powder was soluble in toluene, tetrahydrofuran, chloroform and other organic solvents.

The number average molecular weight of the above polymer powder was 2370, by GPC. The IR spectrum (solvent: ethylbenzene) showed absorptions by NH at wave numbers of 3350 cm$^{-1}$ and 1175 cm$^{-1}$, absorption by SiH at 2,170 cm$^{-1}$, and absorptions by SiN and SiNSi at 1020 to 820 cm$^{-1}$. The HNMR spectrum (CDCl$_3$, TMS) of the polymer powder showed wide absorptions, with absorptions of δ4.8 (br, SiH$_2$), δ4.4 (br, SiH$_3$) and δ1.5 (br, NH). (SiH$_2$)/(SiH$_3$) =4.1.

2. Preparation of polyborosilazane

Reference Example 6

100 ml of a pyridine solution of perhydropolysilazane obtained in Reference example 4 (concentration of perhydropolysilazane: 5.10% by weight) was charged in an autoclave having a volume of 300 ml and 4.0 cc (0.035 mol) of trimethylborate was added thereto.

The reaction was thus conducted in a closed system while stirring at 160° C. for 3 hours. After the reaction, the pressure was raised by 1.0 kg/cm$^2$. The reaction mixture was cooled to the room temperature, 100 ml of dry o-xylene was added, and the solvent was removed at 3 to 5 mmHg and 50 to 70° C., whereby 5.45 g of white powder was obtained. The powder was soluble in toluene, tetrahydrofuran, chloroform and other organic solvents.

The number average molecular weight of the polymer powder was 2100 by GPC. The IR spectrum of the polymer powder showed absorptions by NH at 3350 cm$^{-1}$ and 1175 cm$^{-1}$, absorption by SiH at 2170 cm$^{-1}$, absorptions by SiH and SiNSi at 1020 to 820 cm$^{-1}$, absorptions by CH at 2960 cm$^{-1}$, 2940 cm$^{-1}$, and 2840 cm$^{-1}$, absorption by SiO at 1090 cm$^{-1}$ and absorptions by BO and BN at 1550 to 1330 cm$^{-1}$. $^1$HNMR spectrum (CDCl$_3$, TMS) of the polymer powder showed absorptions of δ4.8 (br, SiH$_2$), δ4.7 (br, OSiH$_2$), δ4.4 (br, SiH$_3$), δ3.6 (br, CH$_3$O) and δ1.4 (br, NH). The elemental analysis of the polymer, based on the weight, showed;

| Si: | 42.4% | N: | 25.9% |
|-----|-------|-----|-------|
| C: | 8.8% | O: | 12.7% |
| B: | 7.0% | H: | 3.8% |

Reference example 7

100 ml of a o-xylene solution of perhydropolysilazane obtained in Reference example 5 (concentration of perhydropolysilazane: 10.4% by weight) was charged into an autoclave having an inner volume of 300 ml, 17.3 g (0.283 mol) of boron trichloride was added, and the reaction was conducted in this closed system while stirring at 20° C. for 3 hours. A white precipitation was filtered and the filtrate was subjected to vacuum distillation in the same manner as in Reference example 6 to obtain 8.2 g of a colorless transparent rubber-like solid. The number average molecular weight of this solid was 2890 by GPC.

Reference example 8

100 ml of a o-xylene solution of perhydropolysilazane obtained in Reference example 1 (concentration of perhydropolysilazane: 5.84% by weight) was charged into an autoclave having an inner volume of 300 ml, 4.0 cc (0.0396 mol) of pyridine boron complex was added, and the reaction was conducted in this closed system while stirring at 80° C. for 3 hours. The pressure was raised by 0.2 kg/cm² after the reaction. The generated gas was hydrogen by GC. The vacuum distillation in the same manner as in Reference example 6 was effected and 4.98 g of a reddish blown solid was obtained. The number average molecular weight of this solid was 17,000 by GPC.

Reference example 9

100 ml of a o-xylene solution of perhydropolysilazane obtained in Reference example 4 (concentration of perhydropolysilazane: 5.37% by weight) was charged into an autoclave having an inner volume of 300 ml, 3.2 ml (0.0376 mol) of 1,3,5-trimethylborazine was added, and the reaction was conducted in this closed system while stirring at 120° C. for 3 hours. The pressure was raised by 0.3 kg/cm² after the reaction. The generated gas was hydrogen by GC. After cooling to the room temperature, the vacuum distillation in the same manner as in Reference example 6 was effected and 4.86 g of a white powder was obtained. This powder was soluble in toluene, tetrahydrofuran, chloroform or other organic solvents. The number average molecular weight of powder was 2430 by GPC.

Reference example 10

100 ml of a pyridine solution of perhydropolysilazane obtained in Reference example 5 (concentration of perhydropolysilazane: 6.32% by weight) was charged into an autoclave having an inner volume of 300 ml, 5.5 ml (0.0379 mol) of trimethoxyboroxine was added, and the reaction was conducted in this closed system while stirring at 140° C. for 3 hours. The pressure was raised by 0.2 kg/cm² after the reaction. After cooling to the room temperature, the solvent was subjected to the vacuum distillation in the same manner as in Reference example 6, to obtain 5.77 g of a white powder. The powder was soluble in toluene, tetrahydrofuran, chloroform and other organic solvents. The number average molecular weight of this polymer powder was 2640, by GPC.

Reference example 11

100 ml of a pyridine solution of perhydropolysilazane obtained in Reference example 4 (concentration of perhydropolysilazane: 5.80% by weight) was charged into an autoclave having an inner volume of 300 ml, 7.5 ml of tris(dimethylamino) boron and 2.5 g of anhydrous ammonia were added, and the reaction was conducted in this closed system while stirring at 80° C. for 3 hours. After cooling to the room temperature, the vacuum distillation of the solvent was conducted in the same manner as in Reference example 6, to obtain 10.7 g of a white powder. The powder was soluble to toluene, tetrahydrofuran, chloroform and other organic solvents. The number average molecular weight of the polymer powder was 2880, by GPC.

3. Preparation of thermosetting copolymer

Example 1

0.65g of titanium n-butoxide was added to 50 ml of an o-xylene solution of 2.43 g of polycarbosilane (Sinetsu Chemical Co. Ltd.), which was heated and refluxed in nitrogen for 1 hour. After cooling to the room temperature, the reaction mixture was added with 40 ml of an o-xylene solution of perhydropolysilazane obtained in Reference example 2 (1.94 g of perhydropolysilazane) and heated in nitrogen at 100° C. for 1 hour. After again cooling to the room temperature, the solvent was removed at 3 to 7 mmHg and 50 to 70° C., to obtain 4.82 g of a green-black powder. The powder was soluble in toluene, tetrahydrofuran, chloroform and other organic solvents.

The number average molecular weight of the polymer powder was 2540, by GPC. The IR spectrum of the polymer powder showed absorptions by NH at 3350 cm$^{-1}$ and 1170 cm$^{-1}$, absorptions by SiH at 2170 cm$^{-1}$ and 2120 cm$^{-1}$, absorptions by SiH and SiNSi at 1020 to 820 cm$^{-1}$, absorptions by SiCH$_3$ at 1250 cm$^{-1}$, absorption by SiO at 1100 cm$^{-1}$, and absorptions by CH at 2950 cm$^{-1}$, 2900 cm$^{-1}$, 2,880 cm$^{-1}$ and 1470 to 1630 cm$^{-1}$. The $^1$HNMR spectrum (CDCl$_3$, TMS) of the polymer powder showed broad absorptions, with absorptions of δ4.8 (br, SiH$_2$), δ4.3 (br, SiH$_3$), δ0.2 (br, SiCH$_3$), δ1.4 and δ0.9 (br, CH), δ3.7 (br, —C—CH$_2$O).

When the polymer powder was pyrolizzed at 1000° C. in N$_2$, a black solid was obtained with a yield of 65 wt%. A fusion of the polymer powder was not observed during the pyrolysis.

Comparative example 1

50 cc of an o-xylene solution of polycarbosilane (Shinetsu Chemical Co. Ltd.) (2.43 g of polycarbosilane) was added to 40 cc of an o-xylene solution of perhydrosilazane obtained in Reference example 2 (1.94 g of perhydropolysilazane), which was heated and refluxed in N$_2$ for 3 hours. After cooling to the room temperature, the solvent was removed by vacuum distillation at 3 to 7 mmHg and 50 to 70° C., to thereby obtain 4.01 g of a light yellow powder. When the powder was pyrolyzed at 1000° C. in N$_2$, the powder was fused during the pyrolysis and a black porous mass was obtained.

Example 2

In a one liter-four necked flask, 200 ml of anhydrous benzene, 20 g of metal sodium and 7 g of metal potassium were charged and kept at 70° C., 25 g of methyldichlorosilane, 30 g of dimethyldichlorosilane, and 50 g of trimethylchlorosilane were dropped therein, and the reaction was conducted for 24 hours to obtain light yellow polysilane having Si—H bonds and having a number average molecular weight of 400. In a 300 ml-four necked flask, 2.0 g of this polysilane, 0.5 g of zirconium isopropoxide and 40 ml of φ-xylene were charged, heated and refluxed in N$_2$ for 3 hours. After cooling to the room temperature, the above mixture was added to 100 ml of an o-xylene solution of perhydropolysilazane obtained in Reference example 3 (5.4 g of perhydropolysilazane) and heated in N$_2$ at 120° C. for 1 hour. After again cooling to the room temperature, the solvent was removed at 3 to 7 mmHg and 50 to 70° C., to thereby obtain 7.22 g of a light yellow powder. The powder was soluble in toluene, tetrahydrofuran, chloroform and other organic solvents.

The number average molecular weight of the polymer powder was 2480, by GPC. The IR spectrum of the polymer powder showed absorptions by NH at 3350 cm$^{-1}$ and 1170 cm$^{-1}$, absorptions by SiH at 2170 cm$^{-1}$ absorptions by SiH and SiNSi at 1020 to 820 cm$^{-1}$, absorptions by SiCH$_3$ at 1250 cm$^{-1}$, absorption by SiO at 1100 cm$^{-1}$, and absorptions CH at 2950 cm$^{-1}$, 2900 cm$^{-1}$, 2880 cm$^{-1}$ and 1470 to 1360 cm.: The $^1$HNMR spectrum of polymer powder showed broad absorptions, with absorptions of δ4.8 (br, SiH$_2$), δ4.4 (br, SiH$_3$), δ0.2 (br, SiCH$_3$), δ1.4 and δ0.9 (br, CH), and δ3.5 (br, —C—CHO).

The polymer powder was pyrolyzed in N₂ at 1000° C. and a black solid was obtained with a yield of 82 wt%. The polymer powder was not fused during the pyrolysis.

Example 3

In a 300 ml-four necked flask, 40 ml of an o-xylene solution of polysilastyrene (Nippon Soda Co. Ltd.) (1.84 g of polysilastyrene) and 40 ml of an o-xylene solution of perhydropolysilazane obtained in Reference example 1 (1.85 g of perhydropolysilazane) were charged and cooled to 0° C., 0.03 g of boron trichloride was added thereto, little by little, and the mixture was then heated to 60° C. and kept at that temperature for 1 hour. After cooling to the room temperature, the solvent was removed to obtain 3.35 g of a light yellow powder.

The powder was pyrolyzed in N₂ at 1000° C. and a black solid was obtained with a yield of 78% by weight. The powder was not fused during the pyrolysis.

Example 4

A 500 ml-four necked flask was provided with a mechanical stirrer, a gas inlet tube, a cooling tube and a dropping funnel, and into this flask, 50 g of a disilane mixture of 50% by weight of tetrachlorodimethyldisilane and 50% by weight of trichlorotrimethyldisilane was introduced, and while the atmosphere therein was kept at N₂, 120 g of hexamethyldisilazane was added to the disilane through the dropping funnel. The obtained mixture was heated in N₂ up to 220° C., while removing the by-product, and was then kept at 220° C. for 3 hours, and then cooled to the room temperature to obtain a milk-white glassy polymer. 300 ml of dry toluene was added to the above reaction mixture to dissolve the polymer in toluene and the solution was filtered through a membrane filter with 1.0 μm mesh. The solvent of the filtrate was removed to obtain 22.5 g of a light yellow resinous solid. The softening point of this resin was about 80° C.

1.5 g of the above resin was dissolved in 30 ml of o-xylene and the obtained solution was charged in a 300 ml-four necked flask, into which 100 ml of an o-xylene solution of perhydropolysilazane obtained in Reference example 2 (4.30 g of perhydropolysilazane) was added and cooled by ice, 0.15 g of triethylaluminum was added into the flask, and the mixture was gradually heated to 80° C. and kept at 80° C. for 1 hour. The mixture was cooled to room temperature and the solvent was removed to obtain 5.45 g of a light yellow powder.

The powder was pyrolyzed in N₂ at 1000° C. to obtain a black solid with a yield of 84% by weight. The powder was not fused during the pyrolysis.

Example 5

0.65 g of titanium n-butoxide was added to 5 50 ml of an o-xylene solution of polycarbosilane (Shinetsu Chemical Co. Ltd.) (2.43 g of polycarbosilane), and the mixture was refluxed in N₂ for 1 hour. After cooling to the room temperature, 40 ml of an φ-xylene solution of polyborosilazane obtained in Reference example 6 (1.94 g of polyborosilazane) was added to the refluxed mixture, which was heated in N₂ at 100° C. for 1 hour. After again cooling to the room temperature, the solvent was removed from the reaction mixture at 3 to 7 mmHg and 50 to 70° C. to obtain 4.82 g of a green-black powder.

The green-black powder was soluble in toluene, tetrahydrofuran, chloroform and other organic solvents.

The number average molecular weight of the polymer powder was 2540 by GPC. The IR spectrum of the polymer powder showed absorptions by NH at 3350 cm⁻¹ and 1170 cm⁻¹, absorptions by SiH at 2170 cm⁻¹ and 2120 cm⁻¹, absorptions by SiH and SiHSi at 1020, to 820 cm⁻¹, absorptions by SiCH₃ at 1250 cm⁻¹, absorption by SiO at 1100 cm⁻¹, absorptions by CH at 2950 cm⁻¹, 2900 cm⁻¹, 2880 cm⁻¹ and 1470 to 1360 cm⁻¹, and absorptions by BO/BN at 1550 to 1300 cm⁻¹. The ¹HNMR spectrum of polymer powder (CDCl₃, TMS) showed broad absorptions, with absorptions of δ4.8 (br, SiH₂), δ4.3 (br, SiH₃), δ0.2 (br, SiCH₃), δ1.4 and δ0.9 (br, CH), and δ3.7 (br, —C—CH₂O).

The polymer powder was pyrolyzed in N₂ at 1500° C. to obtain a black solid with a yield of 70% by weight. The polymer powder was not fused during the pyrolysis.

Example 6

In a 1 liter-four necked flask, 200 ml of anhydrous benzene, 20 g of metal sodium and 7 g of metal potassium were charged and kept at 70° C., into which 25 g of methyldichlorosilane, 30 g of dimethyldichlorosilane and 50 g of trimethylchlorosilane were dropped, and the reaction was continued for 24 hours to thus obtain light yellow polysilane containing Si—H bonds and having a number average molecular weight of 400. In a 300 ml-four necked flask, 2.0 g of the above polysilane, 0.5 g of zirconium isopropoxide, and 40 ml of φ-xylene were charged and refluxed in N₂ for 3 hour. After cooling to the room temperature, the above mixture was added to 100 ml of φ-xylene solution of polyborosilazane obtained in Reference example 7 (5.4 g of polyborosilazane) and heated in N₂ at 120° C. for 1 hour. After again cooling to the room temperature, the solvent was removed from the reaction mixture at 3 to 7 mmHg and 50 to 70° C., to obtain 7.2 g of light yellow powder. The powder was soluble in toluene, tetrahydrofuran, chloroform and other organic solvents.

The number average molecular weight of the polymer powder was 3100, by GPC.

The polymer powder was pyrolyzed in Ar at 1500° C., to obtain a black solid with a yield of 85% by weight. A fusion of the polymer powder was not observed during the pyrolysis.

Example 7

0.7 g of hafnium-n-butoxide was added to 40 ml of an o-xylene solution of polysilastyrene (Nippon Soda Co. Ltd.) (1.84 g of polysilastyrene) and the mixture was heated and refluxed in N₂ for 1 hour. After cooling to the room temperature, the above mixture was added to 50 ml of o-xylene solution of polyborosilazane obtained in Reference example 8 (2.56 g of polyborosilazane) and heated in N₂ at 100° C. for 30 min. After cooling again to the room temperature, the solvent was removed from the reaction mixture at 3 to 7 mmHg and 50 to 70° C., to obtain 4.75 g of a yellow powder.

The yellow powder was pyrolyzed in N₂ at 1500° C., to obtain a black solid with a yield of 85% by weight. A fusion of the yellow powder was not observed during the pyrolysis.

Example 8

A 500 ml-four necked flask was provided with a mechanical stirrer, a gas inlet, a condenser and a dropping funnel. In the flask, 50 g of a disilane mixture of 50 wt% of tetrachlorodimethyldisilane and 50 wt% of trichlorotrimethyldisilane were introduced, the atmosphere was kept at $N_2$, and 120 g of hexamethyldisilazane was dropped onto the disilane through the funnel. The mixture was heated in $N_2$ up to 220° C., while removing the by-products. The reaction mixture was then kept at 220° C. for 3 hours, and cooled to the room temperature to obtain a milky white glassy polymer, 300 ml of toluene was added thereto to dissolve the polymer, and the solution was filtered through a membrane filter with a 1.0 μm mesh. The solvent was removed from filtrate to obtain 22.5 g of a light yellow resinous solid. The softening point of the resin was about 80° C.

The above polymer was dissolved in 30 ml of φ-xylene, which was charged in a 300 ml-four necked flask. Into the flask, 100 ml of an φ-xylene solution of polyborosilazane obtained in Reference example 9 (4.30 g of polyborosilazane) was added, and was cooled by ice, 0.15 g of triethylaluminum was added thereto, and the mixture was gradually heated to 80° C. and kept there for 1 hour. After cooling to room temperature, the solvent was removed from the reaction mixture to obtain 5.45 g of a light yellow powder.

The powder was pyrolyzed in $N_2$ at 1500° C. to obtain a black solid with a yield of 80% by weight. A fusion of the powder was not observed during the pyrolysis.

Example 9

0.80 g of titanium n-butoxide was added to 50 ml of o-xylene solution of polycarbosilane (Shinetsu C Co. Ltd.) (2.50 g of polycarbosilane) and the mixture was refluxed in $N_2$ for 1 hour. After cooling to the room temperature, the above mixture was added to 40 ml of o-xylene solution of polyborosilazane obtained in Reference example 10 (2.74 g of polyborosilazane) and heated in $N_2$ at 100° C. for 1 hour. After cooling to the room temperature, the solvent was removed from the reaction mixture at 3 to 7 mmHg and 50 to 70° C. to obtain 4.96 g of a blue-black powder. The powder was soluble in toluene, tetrahydrofuran, chloroform and other organic solvents. The number average molecular weight of the polymer powder was 2860 by GPC.

The polymer powder was pyrolyzed in Ar at 1500° C., to obtain a black solid with a yield of 75% by weight. A fusion of the polymer powder was not observed during the pyrolysis.

Example 10

50 ml of an φ-xylene solution of polycarbosilane (Shinetsu Chemical Co. Ltd.) (2.86 g of polycarbosilane), 0.45 g of tris(dimethylamino) borone and 0.5 g of anhydrous ammonia were charged in an autoclave and the reaction was conducted at 80° C. for 1 hour. After the mixture was cooled to the room temperature, unreacted ammonia was removed from and 60 ml of an o-xylene solution of polyborosilazane obtained in Reference example 11 (3.68 g of polyborosilazane) was added to the reaction mixture, and the mixture was heated in $N_2$ at 100° C. for 1 hour. After again cooling to the room temperature, the solvent was removed from the mixture at 3 to 7 mmHg and 50 to 70° C., to obtain 6.32 g of a light yellow powder. The powder was soluble in toluene, tetrahydrofuran, chloroform and other organic solvents. The number average molecular weight of the polymer powder was 3100 by GPC.

The polymer powder was pyrolyzed in $N_2$ at 1500° C., to obtain a black solid with a yield of 77% by weight. A fusion of the polymer powder was not observed during the pyrolysis.

Example 11

6.5 of titanium n-butoxide was added to 500 ml of an o-xylene solution of 25 g of polycarbosilane (Sinetsu Chemical Co., Ltd.), which was heated and refluxed in nitrogen for 1 hour. After cooling to the room temperature, the reaction mixture was added to 400 ml of an o-xylene solution of perhydropolysilazane obtained in Reference example 2 (20 g of perhydropolysilazane) and heated in nitrogen at 100° C. for 1 hour. After again cooling to the room temperature, the solvent was removed at 3 to 7 mmHg and 50 to 70° C., to obtain 48 g of a green-black powder. The powder was soluble in toluene, tetrahydrofuran, chloroform and other organic solvents.

The number average molecular weight of the polymer powder was 2540 by GPC. The IR spectrum of the polymer powder showed absorptions by NH at 3350 $cm^{-1}$ and 1170 $cm^{-1}$, absorptions by SiH at 2170 $cm^{-1}$ and 2120 $cm^{-1}$, absorptions by SiH and SiNSi at 1020 to 820 $cm^{-1}$, absorption by $SiCH_3$ at 1250 $cm^{-1}$, absorption by SiO at 1100 $cm^{-1}$, and absorptions by CH at 2950 $cm^{-1}$, 2900 $cm^{-1}$, 2880 $cm^{-1}$ and 1470 to 1630 $cm^{-1}$. The $^1HNMR$ spectrum ($CDCl_3$, TMS) of the polymer powder showed broad absorptions, with absorptions of $\delta 4.8$ (br, $SiH_2$), $\delta 4.3$ (br, $SiH_3$) and $\delta 0.2$ (br, $SiCH_3$), $\delta 1.4$ and $\delta 0.9$ (br, CH), $\delta 3.7$ (br, —C—$CH_2O$).

The polymer powder was dissolved in φ-xylene and the solvent was removed by a rotary evaporator until the solution exhibited a sufficient spinability. The obtained solution as a spinning solution was transferred into a defoaming vessel of a dry spinning apparatus, kept therein, and defoamed at 60° C. for about 6 hours. Then, the spinning solution kept at 40° C. was drawn through a nozzle having a diameter of 0.1 mm into a dry air atmosphere at 120° C. in a spinning chamber, and wound up at a speed of 100 m/min to obtain a fiber having an average diameter of about 10 μm.

This fiber, under a tension of 500 g/$mm^2$, was heated in nitrogen atmosphere from the room temperature to 1500° C. at a rate of 600° C./hour and kept at 1500° C. for 1 hour to obtain a black fiber. The fiber had a diameter of about 8.5 μm, a tensile strength of 220 kg/$mm^2$, and a modulus of 30 ton/$mm^2$. An X-ray diffraction analysis of the fiber showed microcrystalline β-SiC having an average crystallite size 3 nm. An elemental analysis of the fiber showed, on the weight basis, 66.6% of Si, 10.6% of N, 18.2% of C, 2.56% of O and 1.94% of Ti.

Example 12

In a one liter-four necked flask, 200 ml of anhydrous benzene, 20 g of metal sodium and 7 g of metal potassium were charged and kept at 70° C. 25 g of methyldichlorosilane, 30 g of dimethyldichlorosilance and 50 g of trimethylchlorosilane were dropped therein and the reaction was conducted for 24 hours to obtain light yellow polysilane having Si—H bonds and having a number average molecular weight of 400. In a 1 liter-four necked flask, 20 g of this polysilane, 5 g of zirconium isopropoxide and 400 ml of o-xylene were charge, heated and refluxed in $N_2$ for 3 hours. After cooling to the room temperature, the above mixture was added to 300 ml of an o-xylene solution of perhydropolysilazane obtained in Reference example 3 (55 g of perhydropolysilazance) and heated in $N_2$ at 120° C. for 1 hour. After again cooling to the room temperature, the solvent was removed at 3 to 7 mmHg and 50 to 70° C., to thereby obtain 72 g of a light yellow powder. The powder was soluble in toluene, tetrahydrofuran, chloroform and other organic solvents.

The number average molecular weight of the polymer powder was 2480 by GPC. The IR spectrum of the polymer powder showed absorptions by NH at 3350 $cm^{-1}$ and 1170 $cm^{-1}$, absorption by SiH at 2170 $cm^{-1}$, absorptions by SiH and SiNSi at 1020 to 820 $cm^{-1}$, absorptions by $SiCH_3$ at 1250 $cm^{-1}$, absorption by SiO at 1100 $cm^{-1}$ and absorptions by CH at 2950 $cm^{-1}$, 2900 $cm^{-1}$, 2880 $cm^{-1}$ and 1470 to 1360 $cm^{-1}$. $^1HNMR$ spectrum of the polymer powder showed broad absorptions with absorptions of $\delta 4.8$ (br, $SiH_2$), $\delta 4.4$ (br, $SiH_2$), $\delta 0.2$ (br, $SiCH_3$), $\delta 1.4$ and $\delta 0.9$ (br, CH) and $\delta 3.5$ (br, —C—CHO).

The polymer powder was dissolved in toluene and the solvent was removed by a rotary evaporator until the solution exhibited a sufficient spinability. The obtained solution as a spinning solution was transferred into a defoaming vessel of a dry spinning apparatus, kept herein, and defoamed at 60° C. for about 4 hours. Then, the spinning solution kept at 30° C. was drawn through a nozzle having a diameter of 0.08 mm into a dry air atmosphere at 80° C. in a spinning chamber, and wound up at a speed of 100 m/min to obtain a fiber having an average diameter of about 10 $\mu m$.

This fiber, under a tension of 300 $g/mm^2$, was heated in nitrogen atmosphere from the room temperature to 1400° C. at a rate of 600° C./hour and kept at 1400° C. for 1 hour to obtain a black fiber. The fiber had a diameter of about 9 $\mu m$, a tensile strength of 180 $kg/mm^2$ and a modulus of 24 $ton/mm^2$. An X-ray diffraction analysis of the fiber showed microcrystalline $\beta$-SiC having an average crystallite size of 4.3 nm. An elemental analysis of the fiber showed, or the weight basis, 62.3% of Si, 8.51% of N, 23.2% of C, 1.50% of O and 2.14% of Zr.

Example 13

A 500 ml-four necked flask was provided with a mechanical stirrer, a gas inlet, a condenser and a dropping funnel. Into this flask, 50 g of a disilane mixture of 50% by weight of tetrachlorodimethyldisilane and 50% by weight of trichlorotrimethyldisilane was introduced, and while the atmosphere therein was kept at $N_2$, 120 g of hexamethyldisilazane was added to the disilane through the dropping funnel. The obtained mixture was heated in $N_2$ up to 220° C. while removing the by-product, it was then kept at 220° C. for 3 hours, and then cooled to the room temperature to obtain a milk-white glassy polymer. 300 ml of dry toluene was added to the above reaction mixture to dissolve the polymer in toluene, and the solution was filtered through a membrane filter with a 1.0 $\mu m$ mesh. The solvent of the filtrate was removed to obtain 22.5 g of a light yellow resinous solid. The softening point of this resin was about 80° C.

15 g of the above resin was dissolved in 200 ml of o-xylene and the obtained solution was charged in a 1 liter-four necked flask, into which 500 ml of an o-xylene solution of perhydropolysilazane obtained in Reference example 2 (45 g of perhydropolysilazane) was added and cooled by ice. 1.5 g of triethylaluminum was added into the flask and the mixture was gradually heated to 80° C. and kept at 80° C. for 1 hour. The mixture was cooled to room temperature and the solvent was removed to obtain 50 g of a light yellow powder.

The light yellow polymer powder was dissolved in o-xylene and the solvent was removed by a rotary evaporator until the solution exhibited a sufficient spinability. The obtained solution as a spinning solution was transferred into a defoaming vessel of a dry spinning apparatus, kept therein, and defoamed at 60° C. for about 4 hours. Then, the spinning solution kept at 60° C. was drawn through a nozzle having a diameter of 0.1 mm into a dry air atmosphere at 80° C. in a spinning chamber, and wound up at a speed of 80 m/min to obtain a fiber having an average diameter of about 12 $\mu m$.

The fiber without tension, was heated in nitrogen atmosphere at a pressure of 5 $kg/cm^2$ from the room temperature to 1500° C. at a rate of 600° C./hour and kept at 1500° C. for 1 hour to obtain a black fiber. The fiber had a diameter of about 9 $\mu m$, a tensile strength of 160 $kg/mm^2$ and a modulus of 24 $ton/mm^2$. An X-ray diffraction analysis of the fiber showed microcrystalline $\beta$-SiC having an average crystallite size of 3.3 nm. The elemental analysis of the fiber showed, on the weight basis, 61.6% of Si, 12.3% of N, 18.0% of C, 2.20% of O, and 1.56% of Al.

Example 14

In a 1 liter-four necked-flask, 300 ml of an o-xylene solution of polysilastyrene (Nippon Soda Co. Ltd. (35 g of polyborosilazane) and 300 ml of an o-xylene solution of polyborosilazane obtained in Reference example 6 (35g of polyborosilazane) were charged and cooled to 0° C. 0.6 g of boron trichloride was added thereto, little by little, and the mixture then heated to 60° C. and kept at that temperature for 1 hour.

After cooling to the room temperature, the solvent was removed by a rotary evaporator until the solution exhibited a sufficient spinability.

The obtained solution as a spinning solution was transferred into a defoaming vessel of a dry spinning apparatus, kept therein, and defoamed at 60° C. for about 4 hours. Then, the spinning solution kept at 60° C. was drawn through a nozzle having a diameter of 0.1 mm into a dry air atmosphere at 80° C. in a spinning chamber, and wound up at a speed of 100 m/min to obtain a fiber having an average diameter of about 10 $\mu m$.

This fiber under a tension of 500 $g/mm^2$, was heated in nitrogen atmosphere from the room temperature to 1500° C. at a rate of 600° C./hour, and kept at 1500° C. for 1 hour to obtain a black fiber. The fiber had a diameter of about 9 $\mu m$, a tensile strength of 200 $kg/mm^2$ and a modulus of 28 $ton/mm^2$. An X-ray diffraction analysis of the fiber showed microcrystalline $\beta$-SiC having an average crystallite size of 1.4 nm. An elemental analysis of the fiber showed, on the weight basis, 57.8% of Si, 12.3% of N, 20.2% of C, 1.85% of O and 6.75% of B.

What is claimed is:

1. A thermosetting copolymer comprising a perhydropolysilazane or polyborosilazane block A and a thermoplastic silicon-containing polymer block B, said perhydropolysilazane block comprising a main repeating unit represented by the formula:

and having a number average molecular weight of 100 to 50,000, said polyborosilazane block having a main cross linkage represented by any one of the following formulae (i), (ii), (iii), or (iv);

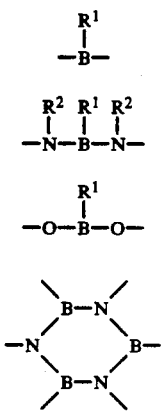

where $R^1$ stands for hydrogen atom, halogen atom, alkyl having 1 to 20 carbon atoms, alkenyl, cycloalkyl, aryl, alkoxy, alkylamino, hydroxy or amino, and $R^2$ stands for a hydrogen atom, halogen atom and alkyl having 1 to 20 carbon atoms, and in the formula (iv), at least two of the three nitrogen atoms and three boron atoms are used for the cross linkage and the remaining atoms are bound to $R^1$, and having an atomic ratio of B/Si of 0.01 to 3 and a number average molecular weight of 200 to 50,000.

2. A thermosetting copolymer according to claim 1, wherein said thermoplastic silicon-containing polymer is selected from the group consisting of polysilane, polycarbosilane, polysiloxane, polysilazane.

3. A thermosetting copolymer according to claim 1, wherein an atomic ratio of Si contained in said block A to Si contained in said block B is at least 1.

4. A thermosetting copolymer according to claim 1, wherein said block A is made of perhydropolysilazane.

5. A thermosetting copolymer according to claim 1, wherein said block A is of polyborosilazane formed by a reaction between a polysilazane having a main repeating unit represented by the formula (I):

where $R^1$, $R^2$ and $R^3$ independently stand for a hydrogen atom, alkyl, alkenyl, cycloalkyl, aryl, aralkyl, alkylsilyl, alkylamino or alkoxy, but at least one of $R^1$, $R^2$ and $R^3$ is a hydrogen atom, and having a number average molecular weight of about 100 to 50,000, with a boron compound represented by the formulas (II), (III), (IV) or (V):

$(R^4BO)_3$ (II)

$B(R^4)_3$ (III)

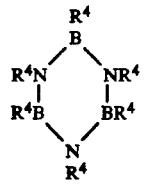

$B(R^4)_3:L$ (V)

wherein L is a compound which forms a complex with $B(R^4)_3$ and where $R^4$ may be the same or different and stands for a hydrogen atom, halogen atom, or 1 to 20 carbon atom-containing alkyl, alkenyl, cycloalkyl, aryl, alkoxy, alkylamino, hydroxy or amino, said polyborosilazane having an atomic ratio of boron/silicon of 0.01 to 3 and a number average molecular weight of about 200 to 50,000.

6. A thermosetting copolymer according to claim 5, wherein said polysilazane forming the polyborosilazane is perhydropolysilazane.

7. A process for producing a thermosetting copolymer comprising reacting a perhydropolysilazane or polyborosilazane with a thermoplastic silicon-containing polymer, said perhydropolysilazane comprising a main repeating unit represented by the formula:

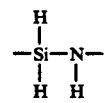

and having a number average molecular weight of 100 to 50,000, said polyborosilazane having a main cross linkage represented by any one of the following formulae (i), (ii), (iii) or (iv):

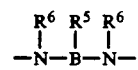

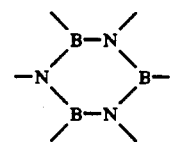

where $R^5$ stand for a hydrogen atom, halogen atom, alkyl having 1 to 20 carbon atoms, alkenyl, cycloalkenyl, aryl, alkoxy, alkylamino, hydroxy or amino, and $R^6$ stands for a hydrogen atom, halogen atom and alkyl having 1 to 20 carbon atoms, and in the formula (iv), at least two of the three nitrogen atoms and three boron atoms are used for the cross linkage and the remaining atoms are bound to $R^5$, and having an atomic ratio of B/Si of 0.01 to 3 and a number average molecular weight of 200 to 50,000.

8. A process according to claim 7, wherein said thermoplastic silicon-containing polymer is selected from the group consisting of polysilane, polycarbosilane, polysiloxane, and polysilazane.

9. A process according to claim 7, wherein a mixing atomic ration of Si contained in said perhydropolysilazane or polyborosilazane to Si contained in said thermoplastic silicon-containing polymer is at least 1.

10. A process according to claim 9 wherein the perhydropolysilazane is reacted with the thermoplastic silicon-containing polymer.

11. A process according to claim 9 wherein said polyborosilazane is a compound formed by a reaction between a polysilazane having a main repeating unit represented by the formula (I);

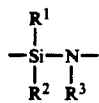
(I)

wherein $R^1$, $R^2$ and $R^3$ independently stand for a hydrogen atom, alkyl, alkenyl, cycloalkyl, aryl, aralkyl, alkylsilyl, alkylamino or alkoxy, but at least one of $R^1$, $R^2$ and $R^3$ is a hydrogen atom.

and having a number average molecular weight of about 100 to 50,000, with a boron compound represented by the formulae (II), (III), (IV) or (V):

$B(R^4)_3$ (II)

$(R^4BO)_3$ (III)

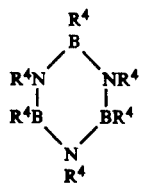
(IV)

$B(R^4)_3 \cdot L$ (V)

wherein L is a compound which forms a complex with $B(R^4)_3$ where $R^4$ may be the same or different and stands for a hydrogen atom, halogen atom, or 1 to 20 carbon-atoms-containing alkyl, alkenyl, cycloalkyl, aryl, alkoxy, alkylamino, hydroxy or amino, said polyborosilazane having an atomic ratio of boron/silicon of 0.01 to 3 and a number average molecular weight of about 200 to 50,000.

12. A process according to claim 11, wherein said polysilazane forming the polyborosilazane is perhydropolysilazane.

13. A process for producing a thermosetting copolymer, comprising reacting a perhydropolysilazane or polyborosilazane, a thermoplastic silicon-containing polymer and metal compound, said perhydropolysilazane comprising a main repeating unit represented by the formula:

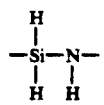

and having a number average molecular weight of 100 to 50,000, said polyborosilazane having a main cross linkage represented by any one of the following formulae (i), (ii), (iii) or (iv):

(i)

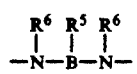
(ii)

(iii)

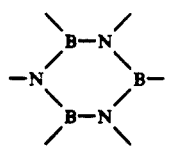
(iv)

where $R^5$ stands for a hydrogen atom, halogen atom, alkyl having 1 to 20 carbon atom, alkenyl, cycloalkenyl, aryl, alkoxy, alkylamino, hydroxy or amino, and $R^6$ stands for a hydrogen atom, halogen atom and alkyl having 1 to 20 carbon atoms, and in the formula (iv), at least two of the three nitrogen atoms and three boron atoms are used for the cross linkage and the remaining atoms are bound to $R^5$ and having an atomic ratio of B/Si of 0.01 to 3 and a number average molecular weight of 200 to 50,000, said metal compound being represented by the formula $MX_n$ where M stands for at least one metal element of B, Al, Ti, Zr and Hf, X may be the same or different and stands for a hydrogen atom, halogen atom, hydroxide, carbonyl, or 1 to 20 carbon atoms-containing alkoxy, phenoxy, acetylacetoxy, alkyl, alkenyl, cycloalkyl, alkylamino or amino, and n is a valence of the metal element M, an atomic ratio of (total Si)/M of said perhydropolysilazane or polyborosilazane, thermoplastic silicon-containing polymer and metal compound being not more than 500.

14. A process according to claim 13, wherein an atomic ratio of Si contained in said perhydropolysilazane or polyborosilazane to Si contained in said thermoplastic silicon-containing polymer is at least 1.

15. A thermosetting copolymer produced by the process as set forth in claim 13.

16. A silicon carbide-based fiber comprising a thermosetting copolymer comprising a perhydropolysilazane or polyborosilazane block A and a thermoplastic silicon-containing polymer block B, said perhydropolysilazane block comprising a main repeating unit represented by the formula:

and having a number average molecular weight of 100 to 50,000, said polyborosilazane block having a main cross linkage represented by any one of the following formulae (i), (ii), (iii), or (iv);

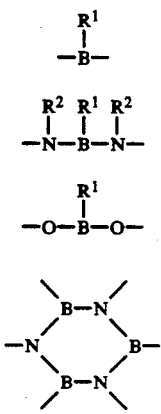

where $R^1$ stand for hydrogen atom, halogen atom, alkyl having 1 to 20 carbon atoms, alkenyl, cycloalkyl, aryl, alkoxy, alkylamino, hydroxy or amino, and $R^2$ stands for a hydrogen atom, halogen atom and alkyl having 1 to 20 carbon atoms, and in the formula (iv), at least two of the three nitrogen atoms and three boron atoms are used for the cross linkage and the remaining atoms are bound to $R^1$, and having an atomic ratio of B/Si of 0.01 to 3 and a number average molecular weight of 200 to 50,000, said fiber comprising silicon, nitrogen and carbon as essential components and oxygen, hydrogen and metal elements of Al, B, Ti, Zr and Hf as optional components; having atomic ratios of N/Si of 0.01 to 1, C/Si of 0.1 to 1.5, O/Si of not more than 0.3, M/Si of 0 to 0.5 where M stands for B, Al, Ti, Zr and hf, and H/Si of not more than 0.1; being substantially comprised of an amorphous phase of silicon, nitrogen and carbon, or an assembly or mixture of an amorphous phase of silicon, nitrogen and carbon and $\beta$-SiC microcrystalline phases having a crystallite size of not more than 50nm; and having ratios of an X-ray small angle scattering intensity thereof to that of air at 1° and 0.5° of 1 to 20 respectively.

17. A silicon carbide-based fiber according to claim 16, wherein said both ratios of X-ray small angle scattering intensity at 1° and at 0.5° are 1 to 5.

18. A silicon carbide-based fiber according to claim 16, which has atomic ratios of 0.1 to 0.7 of N/Si, not more than 0.2 of O/Si, 0.05 to 1.0 of C/Si and 0 to 0.2 of M/Si.

19. A thermosetting copolymer according to claim 1 wherein the thermoplastic silicon-containing polymer is selected from the group consisting of polycarbosilane, polysilastyrene, polycarbosilastyrene, methylpolysilane, phenylpolysilane, polytitanocarbosilane, polyzirconocarbosilane and polysilylazane.

20. A thermosetting copolymer according to claim 7 wherein the thermoplastic silicon-containing polymer is selected from the group consisting of polycarbosilane, polysilastyrene, polycarbosilastyrene, methylpolysilane, phenylpolysilane, polytitanocarbosilane, polyzirconocarbosilane and polysilylazane.

* * * * *